(12) United States Patent
Das et al.

(10) Patent No.: US 12,407,561 B2
(45) Date of Patent: Sep. 2, 2025

(54) NETWORK FUNCTION REQUEST ERROR HANDLING

(71) Applicant: Nokia Technologies Oy, Espoo (FI)

(72) Inventors: Prashanti Das, Bangalore (IN); Bruno Landais, Pleumeur-Bodou (FR); Ioannis Mouroulis, Athens (GR)

(*) Notice: Subject to any disclaimer, the term of this patent is extended or adjusted under 35 U.S.C. 154(b) by 0 days.

(21) Appl. No.: 17/573,410

(22) Filed: Jan. 11, 2022

(65) Prior Publication Data

US 2022/0224589 A1 Jul. 14, 2022

(30) Foreign Application Priority Data

Jan. 13, 2021 (FI) .................................... 20215027

(51) Int. Cl.
| | | |
|---|---|---|
| *H04L 41/0604* | (2022.01) | |
| *H04L 9/32* | (2006.01) | |
| *H04L 41/0654* | (2022.01) | |
| *H04L 67/02* | (2022.01) | |
| *H04L 67/561* | (2022.01) | |

(52) U.S. Cl.
CPC ........ *H04L 41/0627* (2013.01); *H04L 9/3213* (2013.01); *H04L 41/0654* (2013.01); *H04L 67/02* (2013.01); *H04L 67/561* (2022.05)

(58) Field of Classification Search
CPC ............... H04L 41/0627; H04L 9/3213; H04L 41/0654; H04L 67/02; H04L 67/561; H04L 63/0884; H04L 63/0807; H04L 63/0815; H04L 63/308; H04W 12/084; H04W 12/069; G06F 21/445; G06F 21/629

See application file for complete search history.

(56) References Cited

U.S. PATENT DOCUMENTS

| | | | |
|---|---|---|---|
| 2022/0052989 A1* | 2/2022 | Zhao | H04L 63/08 |
| 2022/0052992 A1* | 2/2022 | Zhang | H04W 12/084 |
| 2022/0095111 A1* | 3/2022 | Fu | H04W 36/0011 |

(Continued)

FOREIGN PATENT DOCUMENTS

| | | |
|---|---|---|
| WO | 2020/030291 A1 | 2/2020 |
| WO | 2020/141356 A1 | 7/2020 |

(Continued)

OTHER PUBLICATIONS

3rdGenerationPartnershipProject;TechnicalSpecificationGroupCore NetworkandTerminals;5GSystem;NetworkunctionRepositoryServic es;Stage3(Release17),3GPPTS29.510,V17.0.0, Dec. 2020,pp. 1-229. (Year: 2020).*

(Continued)

*Primary Examiner* — Philip J Chea
*Assistant Examiner* — James Ross Hollister
(74) *Attorney, Agent, or Firm* — Capitol Patent & Trademark Law Firm, PLLC

(57) ABSTRACT

According to an example aspect, there is provided a method, comprising: receiving, by a service communication proxy from a network function consumer, a service request for a service by a network function producer, transmitting, in response to an error in obtaining an access token from a network repository function on the basis of the service request, a response to the service request to the network function consumer, wherein the access token is for authorizing access to a service at the network function producer and the response is indicative of an access token error.

11 Claims, 3 Drawing Sheets

(56) References Cited

U.S. PATENT DOCUMENTS

| | | | |
|---|---|---|---|
| 2023/0056723 A1* | 2/2023 | Jost | H04L 9/3213 |
| 2023/0262459 A1* | 8/2023 | Li | G06F 21/33 |
| | | | 455/410 |

FOREIGN PATENT DOCUMENTS

| | | | |
|---|---|---|---|
| WO | 2020/221219 A1 | 11/2020 | |
| WO | WO 2020/221219 | 11/2020 | |

OTHER PUBLICATIONS

Extended European Search Report received for corresponding European Patent Application No. 22150876.5, dated Jun. 1, 2022, 6 pages.

3rd Generation Partnership Project; Technical Specification Group Services and System Aspects; Security architecture and procedures for 5G system (Release 17), 3GPP TS 33.501, V17.0.0, Dec. 2020, pp. 1-253.

"3rd Generation Partnership Project; Technical Specification Group Core Network and Terminals; 5G System; Common Data Types for Service Based Interfaces; Stage 3 (Release 16)", 3GPP TS 29.571, V16.5.0, Sep. 2020, pp. 1-122.

"3rd Generation Partnership Project; Technical Specification Group Services and System Aspects; System architecture for the 5G System (5GS); Stage 2 (Release 16)", 3GPP TS 23.501, V16.6.0, Sep. 2020, pp. 1-447.

"3rd Generation Partnership Project; Technical Specification Group Services and System Aspects; Security architecture and procedures for 5G system (Release 16)", 3GPP TS 33.501, V16.4.0, Sep. 2020, pp. 1-250.

Hardt, "The OAuth 2.0 Authorization Framework", RFC 6749, Internet Engineering Task Force, Oct. 2012, pp. 1-76.

"3rd Generation Partnership Project; Technical Specification Group Core Network and Terminals; 5G System; Restoration Procedures (Release 16)", 3GPP TS 23.527, V16.4.0, Sep. 2020, pp. 1-24.

"3rd Generation Partnership Project; Technical Specification Group Core Network and Terminals; 5G System; Session Management Services; Stage 3 (Release 16)", 3GPP TS 29.502, V16.5.0, Sep. 2020, pp. 1-260.

Office action received for corresponding Finnish U.S. Appl. No. 20/215,027, dated Jul. 23, 2021, 11 pages.

"3rd Generation Partnership Project; Technical Specification Group Core Network and Terminals; 5G System; Technical Realization of Service Based Architecture; Stage 3 (Release 17)", 3GPP TS 29.500, V17.1.0, Dec. 2020, pp. 1-90.

"3rd Generation Partnership Project; Technical Specification Group Core Network and Terminals; 5G System; Network Function Repository Services; Stage 3 (Release 17)", 3GPP TS 29.510, V17.0.0, Dec. 2020, pp. 1-229.

"Authorization of NF service access for Indirect Communication with Delegated Discovery", 3GPP TSG-CT WG4 Meeting #102-e, C4-211089, Nokia, Feb. 24-Mar. 5, 2021, 7 pages.

Office action received for corresponding Finnish Patent Application No. 20215027, dated Dec. 10, 2021, 9 pages.

ETSI TS 129 510, 5G; 5G System; Network Function Repository Services; Stage 3 (3GPP TS 29.510 version 17.6.0 Release 17), 5.4.2.2.1-5.4.2.2.2, pp. 43-45, Dec. 11, 2020.

"Draft_s3-201800-r3 authorization of nf service access", 3GPP TSG-SA3 Meeting #100e, e-meeting, Aug. 17-28, 2020, pp. 1-15.

Chinese Office Action dated Jul. 4, 2024.

* cited by examiner

NETWORK FUNCTION REQUEST ERROR HANDLING

FIELD

The present disclosure relates to error handling for network function requests, such as access token requests, in communication networks.

BACKGROUND

In networks supporting wireless or wire-based communication, discovering network functions, NFs, and network function services is of interest as many network function instances may be virtualized and be of a dynamic nature. Core network, CN, entities may seek to discover a set of one or more NF instances and NF service instances for a specific NF service or an NF type. Examples of such CN entities include NFs and service communication proxies, SCPs. Examples of NF instances to be discovered include application functions, gateways and subscriber data repositories, and also application related functions, for example for vertical industry support, or entertainment. Further examples include a resource control or management function, a session management or control function, an interworking, data management or storage function, an authentication function or a combination of one or more of these functions. NF service instances, known also as NF services, include individual services provided by an NF. One NF may be configured to provide more than one service, wherein each of the more than one service may be reachable using a different approach, such as a different address or port or communication protocol.

NF service discovery may be enabled via a NF discovery procedure, as specified for wireless communication networks in technical specifications established by the third generation partnership project, 3GPP, or GSMA, GSM association, for example. A network repository function NRF may be configured to act as a service access authorization server, and provide a (service-consuming) network function consumer, or an SCP acting on behalf of the network function consumer, with a cryptographic access token authorizing the network function consumer to use the service provided by a (service-providing) network function producer.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core, at least one memory including computer program code, the at least one memory and the computer program code being configured to, with the at least one processing core, cause the apparatus at least to: receive, from a network function consumer, a service request for a service by a network function producer, transmit, in response to an error in obtaining an access token from a network repository function on the basis of the service request, a response to the service request to the network function consumer, wherein the access token is for authorizing access to a service at the network function producer and the response is indicative of an access token error.

According to a second aspect of the present disclosure, there is provided a method, comprising: receiving, by a service communication proxy from a network function consumer, a service request for a service by a network function producer, transmitting, in response to an error in obtaining an access token from a network repository function on the basis of the service request, a response to the service request to the network function consumer, wherein the access token is for authorizing access to a service at the network function producer and the response is indicative of an access token error.

According to a third aspect, there is provided an apparatus comprising at least one processing core, at least one memory including computer program code, the at least one memory and the computer program code being configured to, with the at least one processing core, cause the apparatus at least to transmit, to a service communication proxy, a service request for a service by a network function producer, receive a response to the service request from the service communication proxy, wherein the response is indicative of an access token error, and control network function service access on the basis of the access token error indicated in the response.

According to a fourth aspect there is provided a method, comprising transmitting, by a network function consumer to a service communication proxy, a service request for a service by a network function producer, receiving a response to the service request from the service communication proxy, wherein the response is indicative of an access token error, and controlling network function service access on the basis of the access token error indicated in the response.

According to some further aspects, there is provided a computer program (product), a computer-readable medium, or a non-transitory computer-readable medium, comprising a set of computer readable instructions that, when executed by at least one processor, cause an apparatus to perform the method of the second aspect or the fourth aspect, or an embodiment thereof.

EMBODIMENTS

Figure 1:
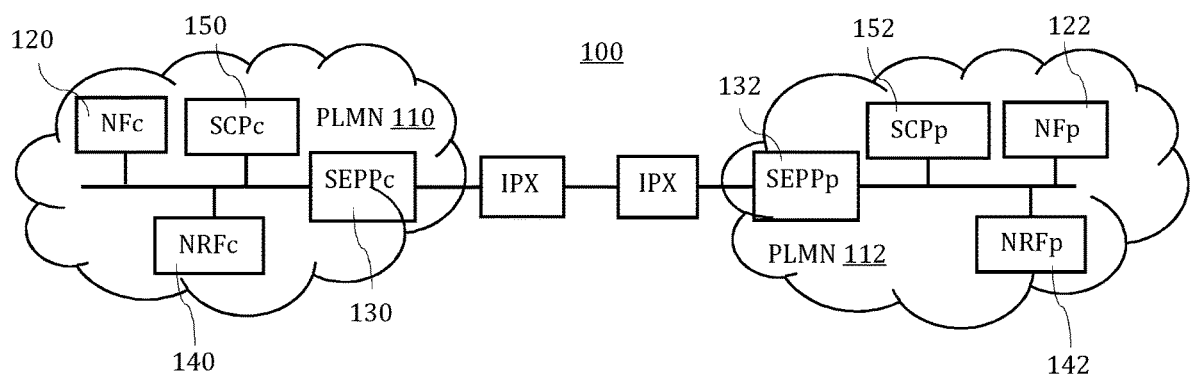
FIG. 1 illustrates an example system in accordance with at least some embodiments.

FIG. 1 illustrates an example system 100, comprising two public land mobile networks, PLMNs, 110, 112, each equipped with a network function, NF, 120, 122. A network function may refer to an operational and/or a physical entity. A network function may be a specific network node or element, or a specific function or set of functions carried out by one or more entities, such as virtualized network elements, VNFs. One physical node may be configured to perform plural NFs. A network function can be implemented either as a network element on a dedicated hardware, as a software instance running on a dedicated hardware, or as a virtualised function instantiated on an appropriate platform, e.g. on a cloud infrastructure. Examples of such network functions include a resource control or management function, session management or control function, interworking, data management or storage function, authentication function or a combination of one or more of these functions.

In case of a third generation partnership project, 3GPP, fifth generation, 5G, system service based architecture, SBA, core network NFs may comprise at least some of an access and mobility management function, AMF, a session management function, SMF, a network slice selection function, NSSF, a network exposure function, NEF, a network repository function, NRF, a unified data management, UDM, an authentication server function, AUSF, a policy control function, PCP, and an application function, AF. The PLMNs may each further comprise a security edge protection proxy, SEPP, 130, 132 configured to operate as a security edge node or gateway. The NFs may communicate with each other using representational state transfer application programming interfaces, for example. These may be known as Restful APis. Further examples of NFs include NFs related to gaming, streaming or industrial process control. The system 100 may comprise also nodes from 3G or 4G node systems, such as home subscriber server, HSS, and a suitable interworking function for protocol translations between e.g. diameter and REST API Json. While described herein primarily using terminology of 5G systems, the principles of the invention are applicable also to other communication networks using proxies as described herein, such as 4G networks and non-3GPP networks, for example.

While the example of FIG. 1 has two PLMNs 110, 122, in general at least some embodiments of the invention may be practiced in a single PLMN, which need not necessarily have SEPPs. In an inter-PLMN case, the SEPP 130, 132 is a network node at the boundary of an operator's network that may be configured to receive a message, such as an HTTP request or HTTP response from an NF, to apply protection for sending and to forward the reformatted message through a chain of intermediate nodes, such as IP eXchanges, IPX, towards a receiving SEPP. The receiving SEPP receives a message sent by the sending SEPP and forwards the message towards an NF within its operator's network, e.g. the AUSF.

In the example of FIG. 1, an NF service may be provided for a service-consuming NF by a service-producing NF, henceforth referred to as NFc 120 and NFp 122. They may also be referred to as NF service consumer and NF service producer, respectively. As noted, the NFc and NFp may reside in the same PLMN or in different PLMNs.

A service communication proxy, SCP, 150, 152 may be deployed for indirect communication between network functions, NFs. An SCP is an intermediate network entity to assist in indirect communication between an NFc and an NFp, including routing messages, such as, for example, control plane messages between the NFs. The SCP may discover and select NFp on behalf of NFc. The SCP may request an access token from the NRF or an Authorization Server on behalf of NFc to access the service of NFp.

NF discovery and NF service discovery enable entities, such as NFc 120 or SCP 150, to discover a set of NF instance(s) and NF service instance(s) for a specific NF service or an NFp type. The NRF 140, 142 may comprise a function that is used to support the functionality of NF and NF service registration, NF and NF service discovery and NF status changes subscription and notification. Additionally or alternatively, the NRF may be configured to act as a service access authorization server. The NRF may maintain an NF profile of available NFp entities and their supported services. The NRF may notify about newly registered, updated, or deregistered NFp entities along with its NF services to a subscribed NFc or SCP. An NRF may thus advise NFc entities or SCP concerning where, that is, from which NFp entities, they may obtain services they need. An NRF may be co-located together with an SCP, for example, run in a same computing substrate. Alternatively, NRF may be in a physically distinct node than an SCP or even hosted by a service provider.

In order for the NFc 120 or SCP 150 to obtain information about the NFp and/or NF service(s) registered or configured in a PLMN/slice, the NFc 120 or SCP 150 may initiate, based on local configuration, a discovery procedure with an NRF, such as cNRF 140. The discovery procedure may be initiated by providing the type of the NFp and optionally a list of the specific service(s) it is attempting to discover. The NFc 120 or SCP 150 may additionally or alternatively provide other service parameters, such as information relating to network slicing.

Direct communication may be applied between NFc 120 and NFp 122 for an NF service, or NF service communication may be performed indirectly via SCP(s) 150, 152. In direct communication, the NFc 120 performs discovery of the target NFp 122 by local configuration or via local NRF, NRFc 140. In indirect communication, the NFc 120 may delegate the discovery of the target NFp 122 to the SCP 150. In the latter case, the SCP may use the parameters provided by NFc 120 to perform discovery and/or selection of the target NFp 122, for example with reference to one or more NRF. In 5G service based interface (SBI) model D, the NFc may delegate the NFp discovery and selection to the SCP and also delegate the service access authorization, i.e. delegate the access token retrieval for accessing the specific NFp's services to the SCP.

It is to be noted that at least some of the entities or nodes 120, 122, 140, 142 may act in both service-consuming and service-providing roles and that their physical structure may be similar or identical, while their role in the present examples in delivery of a particular message or service is identified by use of the prefix/suffix "c" or "p" indicating whether they are acting as the service-consuming or service-producing NF. It is to be noted that instead of "c" and "p", "v" for visited and "h" for home can be used to refer to at least some respective entities in the visited and home PLMNs. In some embodiments, a system implementing an embodiment of the present disclosure comprises both fourth generation, 4G, and fifth generation, 5G, parts.

In general, a network support function such as an NRF may further be configured to act as a service access authorization server, and provide the NFc, or an SCP acting on behalf of the NFc, with a cryptographic access token authorizing the NFc to use the service provided by the NFp. In general, an NRF is a terminological example of a network support node. In general, an SCP is a terminological example of a proxy entity.

In some embodiments OAuth based service authorization and/or token exchange is applied between NFc and NFp for the purpose of authorizing an NFc to access the service of an NFp. Alternatively to OAuth, another authorization framework may be applied. Thus, a network entity, such as an NRF, may be or perform as an authorization server, AS, such as an OAuth authorization server, for example. The NFc may be an OAuth client and the NFp may operate as OAuth resource server, and they may be configured to support OAuth authorization framework as defined in IETF RFC 6749, for example.

The NFc or SCP may include the access token in a request message when requesting the service from the NFp, for example in an "authorization bearer" header. For example, the NRF may act as an OAuth 2.0 authorization server. The access token may comprise e.g. identifiers of the NFc, NRF and/or NFp, a timestamp and/or an identifier of the specific service which is authorised for the NFc with the access token. The access token may comprise a token identifier of itself, for example a serial number. The token identifier may uniquely identify the token. The access token may be cryptographically signed using a private key of the NRF. A validity of such a cryptographic signature may be verified using the corresponding public key of the NRF, which the NFp may obtain in connection with registering with the NRF the service(s) it offers, for example. When the NFc contacts the NFp, it may present the access token, which the NFp may then verify, for example at least in part by using its copy of the public key of the NRF.

In the indirect communication with delegated discovery (also named as model D in 3GPP specifications), the SCP, upon receiving a service request from the NFc, performs the NF discovery, access token request procedure, and requests service from the NFp with the obtained access token. Thus, in indirect communication with delegated discovery the consumers do not do any discovery or selection. The NFc adds any necessary discovery and selection parameters required to find a suitable producer to the service request. The SCP uses the request address and the discovery and selection parameters in the request message to route the request to a suitable producer instance. The SCP can perform discovery with an NRF and obtain a discovery result.

The services of the SCP for the NFc (in response to the service request thereof) may fail during the NF discovery, during the access token request procedure, or during the service request from the SCP to the NFp. When the service request gets rejected during the NF Discovery with the NRF, the NFc is informed about this. When the NFc has delegated access token retrieval for accessing specific NFp services to the SCP, and a service request thus gets rejected, the NFc is not aware of the reason why the service request failed.

There are now provided improvements for error handling and indication particularly for delegated service access authorization.

Figure 2A:
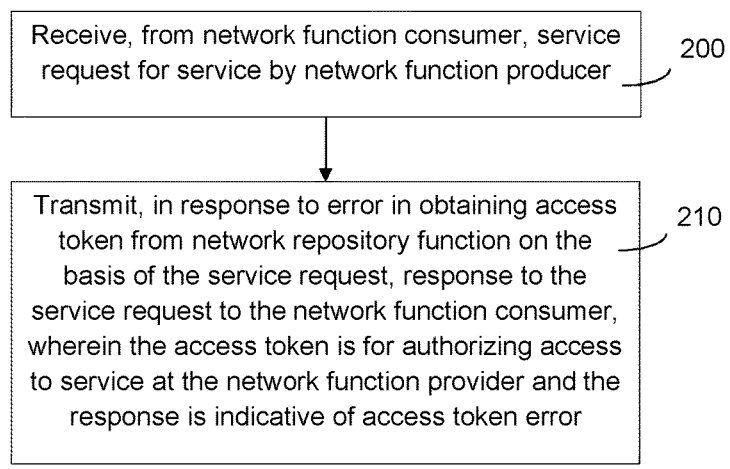
FIGS. 2a and 2b illustrate methods in accordance with at least some embodiments.

FIG. 2a illustrates a method, for access token obtaining procedure error handling. The method may be performed by a proxy network entity, referred to below as service communication proxy or SCP, in some embodiments 3GPP SBA SCP (e.g. the SCP 150), or in a control device configured to control the functioning thereof, when installed therein.

Block 200 comprises receiving, from a network function consumer, referred to below as NFc, e.g. the NFc 120, a service request for a service produced by a network function producer, referred to below as NFp, e.g. the NFp 122.

Block 210 comprises transmitting, in response to an error in obtaining an access token from a network repository function, referred to below as NRF, e.g. the NRF 140 or 142, on the basis of the service request, a response to the service request to the NFc. The access token is for authorizing access to a service at the NFp and the response is indicative of an access token error.

Figure 2B:
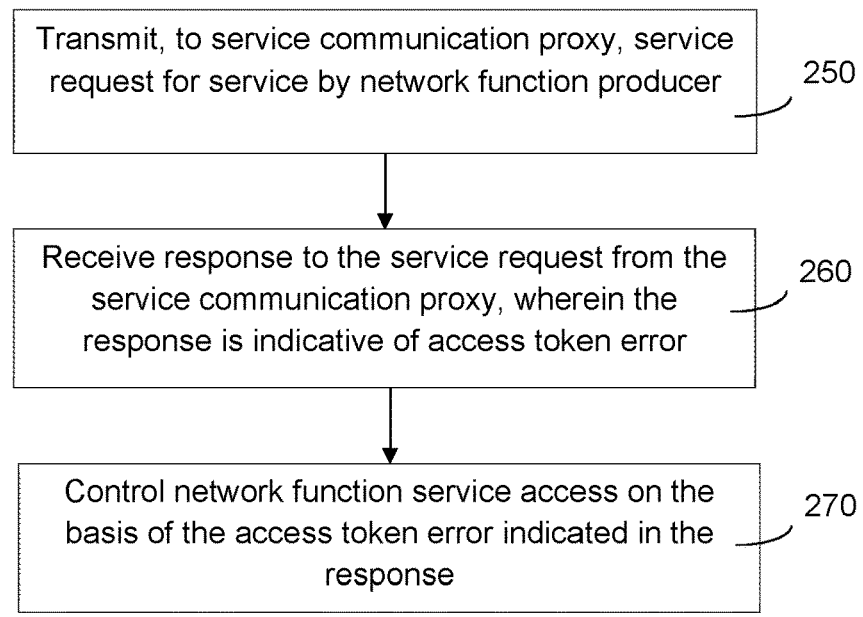

FIG. 2b illustrates a method for controlling network function service access. The method may be performed by a service requesting or consuming network entity, referred to below as network function consumer or NFc, in some embodiments 3GPP SBA NFc (e.g. the NFc 120), or in a control device configured to control the functioning thereof, when installed therein.

Block 250 comprises transmitting, to a service communication proxy (which may be co-operatively performing the method of FIG. 2b), a service request for a service by a network function producer. Block 260 comprises receiving a response to the service request from the service communication proxy, wherein the response is indicative of an access token error. Block 270 comprises controlling network function service access on the basis of the access token error indicated in the response.

The NFc may thus be informed why the service request failed also in case it has delegated service access authorization and access token retrieval for the SCP. This facilitates the NFc to appropriately react to the failed service request and improve error handling and service access reliability level. The NFc may be informed on exact error details and error information in this case, also when the access token request is rejected by the NRF, which may be operating as OAuth2 authorization server. This is useful and important for the NFc, e.g. for troubleshooting, even though the NFc has delegated service access authorization to the SCP.

For example, the response in block 210 and 260 may indicate that the access token obtaining procedure failed due to lacking appropriate client credentials to authorize provision of an access token for the (SCP acting on behalf of) NFc. The NFc may thus, on the basis of the received indicated access token error, initiate specific further action(s) in block 270, such as retransmission via another SCP. Additionally or alternatively, the NFc may raise an alarm and/or update an error log on the basis of at least some of the received error information.

Although example embodiments are illustrated here with references to 3GPP 5G SBA entities and/or with similarly named entities, the presently disclosed features may be applied also in other systems. For example, the service communication proxy may refer generally to a (network function) proxy network entity, the network repository function to (network function) authorization entity, the network function consumer to a network entity using or consuming a service, and the network function producer to a service-providing network entity.

In order for the SCP to acquire an access token on behalf of the NFc, the NFc needs to send certain IE in the Service Request (e.g. its own NFInstance ID, NFType etc). In some embodiments, the access token error is detected and block 210 entered already before (and without) transmitting a request for the access token from the SCP to the NRF.

The error may be detected and block 210 entered in response to failing to generate an appropriate access token request on the basis of the service request. This may be due to insufficient information received 200 in the service request from the NF, in response to which the SCP cannot issue an access token request but instead enters block 210. Thus, there may be a further block of checking the service request after block 200, and block 210 is entered if on the basis of the check information predefined (which may comprise one or more predefined IEs) as required for the access token request is not included (or is erroneously included) in the service request. In an embodiment, block 210 is entered in response to detecting that NFc identification information, such as NFInstanceId, is not included in the service request, such as NFc instance identifier. Some other examples of such information include client credentials and network function type.

The SCP may thus include an indication of a missing access token information element in the response 210, 260 indicative of the access token error. This may be defined as a new HTTP application error. Further reason (for the access token obtaining failing due to failing to generate an appropriate access token request) may be indicated in the response 210. The missing information may be specified as cause value, e.g. missing client credentials or missing requester-nf-instance-id.

The access token error may be due to the NRF rejecting an access token request transmitted by the SCP on the basis of the service request 200, 250. The SCP may detect this based on an access token response received from the NRF. The SCP may indicate the rejection of the access token request in the response 210, 260 by a specific error cause value, such as access token request rejected or access token denied.

Figure 3:
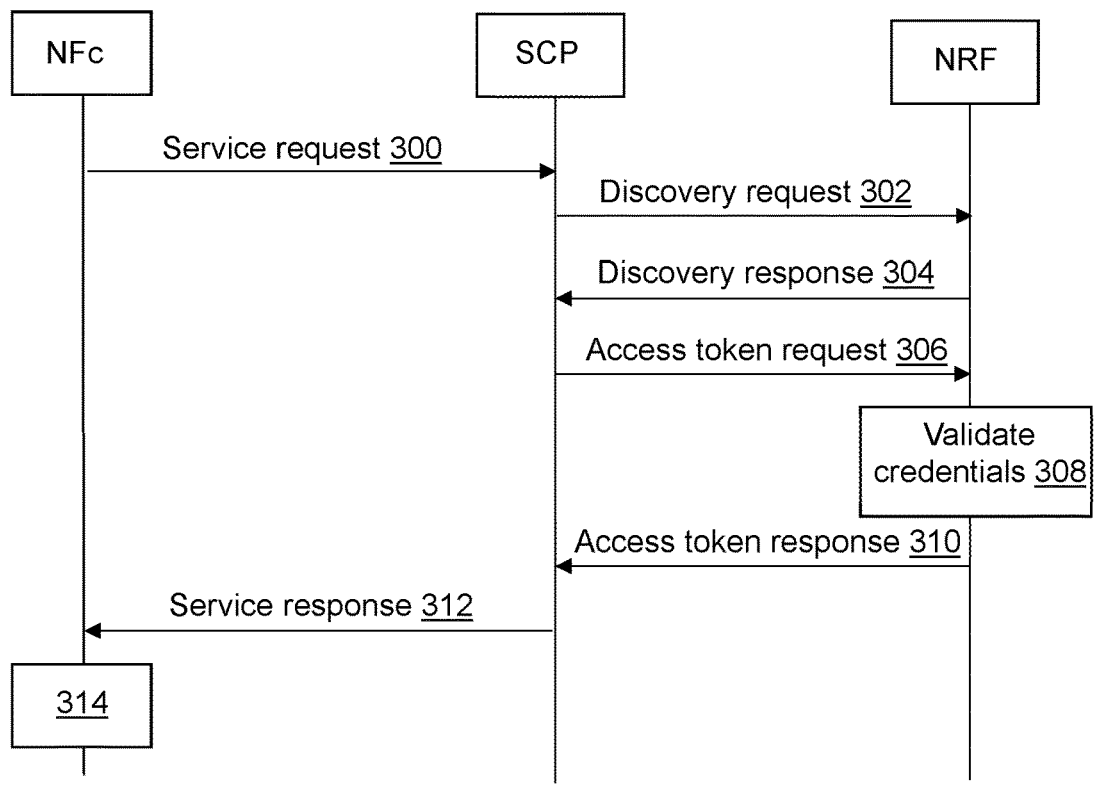
FIGS. 3 and 4 illustrate signalling in accordance with at least some embodiments.
Figure 4:
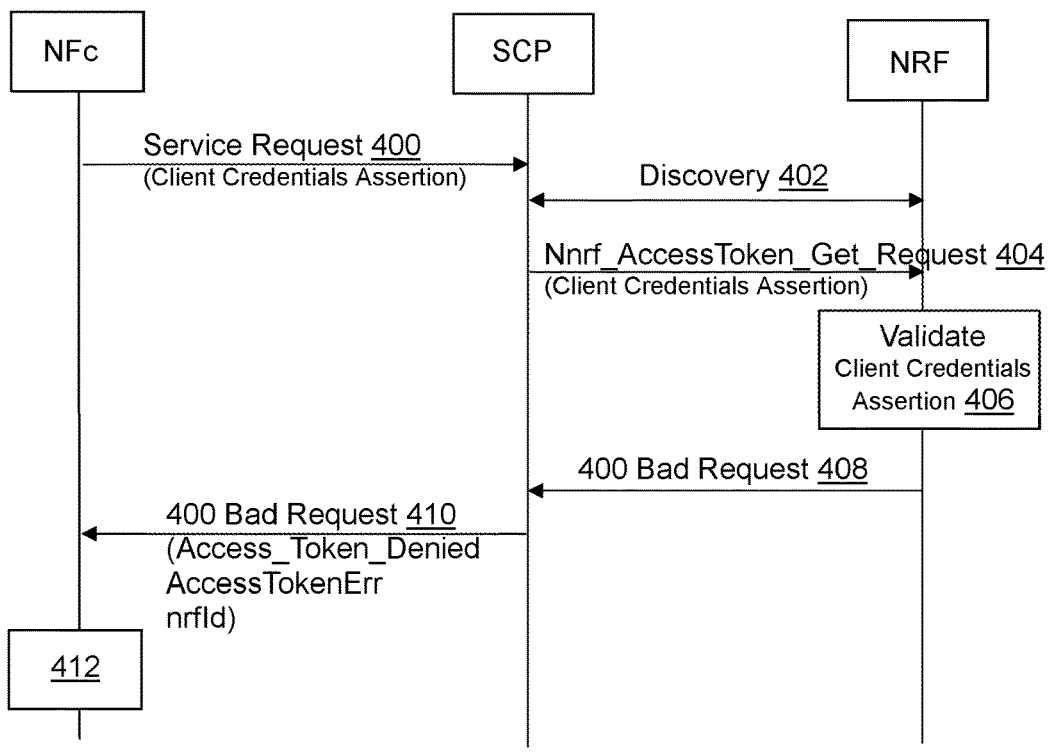

With reference to signalling examples of FIGS. 3 and 4, NFc wants to consume a service provided by NFp. Indirect communication via SCP is used. FIG. 3 illustrates a more general signalling example, whereas FIG. 4 illustrates further embodiments and messages for HTTP based 3GPP SBI. The NFc requests the service by transmitting a service request 300, 400 to SCP. The service request may comprise e.g. NF instance identification information and a credential data element of NFc, such as, for example, a client credentials assertion, CCA, data element that enables the receiving NF, e.g. NRF or NFp, to authenticate the NFc.

The SCP may perform an NF discovery 302, 304, 402 with the NRF in response to the service request 300, 400 from the network function consumer. The SCP thus transmits a discovery request 302, which may describe the service NFc seeks, based on information expressed in service request 300, 400. SCP may include in discovery request at least one of: the credential data element of NFc, and/or a credential data element of SCP itself.

Responsive to the discovery request 302, or other messages from the SCP that relate to acting on behalf of the NFc, NRF may perform a determination as to whether the SCP is authorized to act on behalf of the NFc. The NRF may, after determining whether the SCP is authorized, transmit a discovery response 304 as a NF profile message which may describe NFp entities which offer the service the NFc wishes to obtain. The SCP may select one of the NFp entities from the profile message 304 on behalf of the NFc.

The SCP may then transmit an access token request 306, 404 to request an access token for the selected NFp. In the example of FIG. 4, the access token request is Nnrf Access Token Get Request. The access token request may comprise an identifier of the selected NFp and the client credentials from the NFc. The SCP may perform 308, 406 credentials validation procedure, in block 406 for the received CCA.

On the basis of the (outcome of the) validation procedure, the NRF transmits an access token response 310, 408. In response to the credentials validation 308, 406 failing, the response 310, 408 received by the SCP indicates rejection of the access token request. The response may comprise further information on cause of the rejection. The access token request may be rejected in response to authentication of the NFc failing, e.g. due to missing or incorrect client credentials, or the NFc not being authorized to access the service of the NFp.

The SCP may generate and transmit the response 312, 410 indicative of the access token error to the NFc in response to the received response to the access token request, some further example embodiments further being illustrated below.

The access token error may be indicated in the response 210, 260, 312, 410 by a protocol or application error of the access token being denied, some further examples being illustrated below in connection with HTTP application errors.

The response 210, 260, 312, 410 indicative of the access token error may have one of the 4XX or 5XX status codes, such as "400 Bad Request" 408 or "403 Forbidden". The access token error may be specified in a problem details object 'ProblemDetails' of a HTTP error response message payload.

The SCP may include, in the response 210, 260, 312, 410 indicative of the access token error, an access token error attribute indicating details on the access token error. In an example embodiment, the access token error attribute is included in the 'ProblemDetails' object. Table 1 illustrates an example how an access token error attribute may be defined:

TABLE 1

| Attribute name | Data type | P | Cardinality | Description |
| --- | --- | --- | --- | --- |
| accessTokenErr | accessTokenErr | C | 0 . . . 1 | This IE is present when rejecting a request due to access token request error. |

Field "P" defines if the attribute is mandatory "M", optional "O", or conditional "C". Cardinality defines allowed number of occurrence of the respective data type. The SCP may copy 'AccessTokenErr' attribute received from the NRF and the Server header content received from the NRF to the ProblemDetails attributes accessTokenErr and Server, respectively.

The SCP may include an indication of an access token denied error in the response 210, 260, 312, 410 indicative of the access token error. The access token error may thus be indicated by a protocol or application error of the access token being denied. In an example embodiment, the access token denied is included as new HTTP application error value in an existing cause attribute in the 'ProblemDetails' object. The SCP may include ACCESS_TOKEN_DENIED as a new cause when rejecting a service request due to rejection of Access Token Request from NRF with AccessTokenErr attribute.

Table 2 illustrates an example how the access token denied error may be defined:

TABLE 2

| Protocol or application Error | HTTP status code | Description |
| --- | --- | --- |
| ACCESS_TOKEN_DENIED | 400 Bad Request | The request is rejected by the SCP because the access token request is rejected by the NRF. "accessTokenErr" attribute is included in the "Problem Details" data structure indicating details on the access token error. |

The SCP may include in the response 210, 260, 312, 410 an indication an identity of the NRF that rejected the access token request. A new attribute, e.g. in the "ProblemDetails" object, may be defined for this purpose. Such new attribute may be referred e.g. as to "nrfId". The attribute may indicate the identity of the NRF that rejected the access token request and that will be set to the value in the 'Server' header received from NRF. In case NRF does not indicate the 'Server' header then the attribute is not included. The SCP may add 'Server' header indicating its own address in the in the response to the NFc. For example, such attribute may be defined as illustrated in Table 3.

TABLE 3

| Attribute name | Data type | P | Cardinality | Description |
|---|---|---|---|---|
| nrfId | string | O | 0 ... 1 | This IE may be present when rejecting a request due to an access token request error or an NF discovery error. |

The SCP may include in the response 210, 260, 312, 410 information further specifying the rejection of the access token request, on the basis of the received response to the access token request from the NRF.

In an example embodiment, the SCP includes in the response 210, 260, 312, 410 a target network function instance identifier or target network function set that was discovered and selected by the SCP. As an example implementation, the ProblemDetails object may be extended with a new accessTokenReq attribute encoding the Access Token Request parameters.

With again reference to FIG. 4, in case of unsuccessful access token request, the NRF may respond with 400 Bad Request 408 with an access token error information element. Responsive to this message, the SCP sends a 400 Bad Request response 410 to the NF Service Consumer, which may include a ProblemDetails object in the HTTP response payload with at least some of:
- the "cause" attribute set to "ACCESS_TOKEN_DENIED"; and
- the new AccessTokenErr attribute, which may be generated based on AccessTokenErr object received from NRF;
- the nrfId attribute set to the Server header content received from NRF.

In the response 210, 260, 312, 410, the SCP may set the Server header to the SCP identity (or fully qualified domain name (FQDN)). As already noted, the response may also include additional information in ProblemDetails object, in the new accessTokenError attribute or in another new attribute in ProblemDetails, about the NF access token request that was rejected. For example, such information may include the target NF Instance ID or target NF Set that was discovered and selected by the SCP and for which an access token was requested.

Annex 1 illustrates an example of attributes for a ProblemDetails object, including new attributes accessTokenErr, nrfId, target NF instance ID, and target NF set. Example definition for the AccessTokenErr attribute is also provided, indicative also of further error (cause) information that may be applied. At least some of these attributes may be applied in the response 210, 260, 312, 410.

Subsequent service access control 270, 314, 412 after receiving the response 210, 260 and associated error handling at the NFc may be implementation specific and dependent on the further error information included in the response. This may comprise one or more of retry of the request (with another SCP), raise an alarm, log an error, which may comprise updating an error log on the basis of at least some of the received error information, or increment associated counter(s). For example, the NFc may retry the request with modified headers 3gpp-Sbi-Discovery and 3gpp-Sbi-Client-Credentials, raise an alarm, and/or increment an associated counter indicating OAuth failure.

The NFc may be configured to receive information and message element(s) specifying the access token error as above illustrated and apply them in block 270, 314, 412. For example, the NFc may be configured to process the new cause 'ACCESS_TOKEN_DENIED' with "AccessTokenErr' attribute. The NFc may then use the attribute information in the subsequent NF service access control action and/or to determine further NF service access control action.

At least some of the above illustrated embodiments may also be applied to indirect communication without delegated discovery. For example, this may be when the NFc only selects an NF set but delegates to the SCP the discovery and selection of a NFp from the NF set, or when the NFc sends a subsequent service request (targeting an existing resource) and delegates to the SCP the reselection of an alternative NF service producer if the SCP cannot send the request to the target NF indicated in Request URI or 3gpp-Sbi-TargetapiRoot header in the service request 200, 250. This may also be applied to a scenario where the SCP handles the redirection when a NFp redirects to another NFp.

Some service operations do not return an HTTP error response including a ProblemDetails object, but define their own HTTP response payload for error responses, if an attribute is already defined as ProblemDetails in the API error response. At least some of the above illustrated embodiments may also be applied also for such operations. An example of such operation is Nsmf_PDUSession Create SM Context service operation. If no such attribute exists, a new error attribute can be defined to provide the access token error information for the NFc. This may be performed similarly as defined above for the ProblemDetails. For example, for the Nsmf_PDUSession Create SM Context service operation, an "error" attribute in the SmContextCreateError may be extended to include the further access token error information.

As a possible alternative to the above case, a new HTTP custom header, such as 3gpp-Sbi-Scp-Error, may be defined to be returned by the SCP towards an HTTP client (of the NFc) for errors generated by the SCP. The header may comprise similar information regarding the access token error as illustrated above for the ProblemDetails element. For example, the header could be defined as a string encoding a ProblemDetails structure. Accordingly, new protocol information as illustrated above may thus be conveyed in such new HTTP custom header. This header could even possibly be returned by the SCP for any service request (i.e. any service operation) and not necessarily only for service operations that do not return an HTTP error response containing a ProblemDetails object, but that define their own HTTP response payload for error responses.

Figure 5:
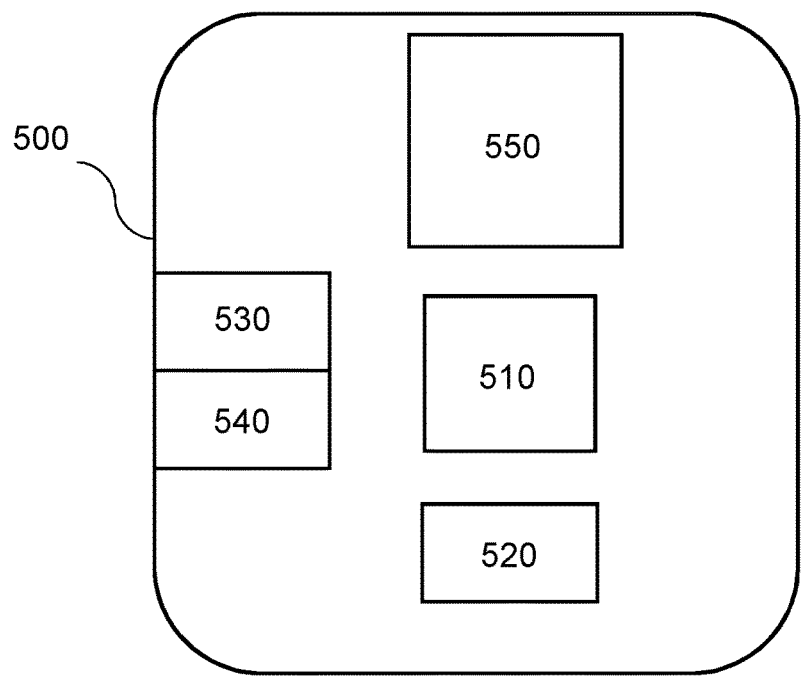
FIG. 5 is an example apparatus capable of supporting at least some embodiments.

FIG. 5 illustrates an example apparatus capable of supporting at least some embodiments of the present invention. Illustrated is device 500, which may comprise, for example, in applicable parts, a physical node running a NFc, an SCP and/or an NRF, for example. The device may be configured to perform the method of FIG. 2a, 2b, or an embodiment thereof.

Comprised in device 500 is processor 510, which may comprise, for example, a single- or multi-core processor wherein a single-core processor comprises one processing core and a multi-core processor comprises more than one processing core. Processor 510 may comprise, in general, a control device. Processor 510 may comprise more than one processor. Processor 510 may be a control device. Processor 510 may comprise at least one application-specific integrated circuit, ASIC. Processor 510 may comprise at least one field-programmable gate array, FPGA. Processor 510 may be means for performing method steps in device 500, such as receiving, transmitting and/or providing, for example. Processor 510 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 500 may comprise memory 520. Memory 520 may comprise random-access memory and/or permanent memory. Memory 520 may comprise at least one RAM chip. Memory 520 may comprise solid-state, magnetic, optical and/or holographic memory, for example. Memory 520 may be at least in part accessible to processor 510. Memory 520 may be at least in part comprised in processor 510. Memory 520 may be means for storing information. Memory 520 may comprise computer instructions that processor 510 is configured to execute. When computer instructions configured to cause processor 510 to perform certain actions are stored in memory 520, and device 500 overall is configured to run under the direction of processor 510 using computer instructions from memory 520, processor 510 and/or its at least one processing core may be considered to be configured to perform said certain actions. Memory 520 may be at least in part comprised in processor 510. Memory 520 may be at least in part external to device 500 but accessible to device 500.

Device 500 may comprise a transmitter 530. Device 500 may comprise a receiver 540. Transmitter 530 and receiver 540 may be configured to transmit and receive, respectively, information in accordance with at least one cellular or non-cellular standard. Transmitter 530 may comprise more than one transmitter. Receiver 540 may comprise more than one receiver. Transmitter 530 and/or receiver 540 may be configured to operate in accordance with a suitable messaging protocol.

Device 500 may comprise user interface, UI, 550. UI 550 may comprise at least one of a display, a keyboard and a touchscreen. A user may be able to operate device 500 via UI 560, for example to configure operating parameters, such as SCP service request handling related parameters.

Processor 510 may be furnished with a transmitter arranged to output information from processor 510, via electrical leads internal to device 500, to other devices comprised in device 500. Such a transmitter may comprise a serial bus transmitter arranged to, for example, output information via at least one electrical lead to memory 520 for storage therein. Alternatively, to a serial bus, the transmitter may comprise a parallel bus transmitter. Likewise, processor 510 may comprise a receiver arranged to receive information in processor 510, via electrical leads internal to device 500, from other devices comprised in device 500. Such a receiver may comprise a serial bus receiver arranged to, for example, receive information via at least one electrical lead from receiver 540 for processing in processor 510. Alternatively, to a serial bus, the receiver may comprise a parallel bus receiver. Device 500 may comprise further devices not illustrated in FIG. 5. In some embodiments, device 500 lacks at least one device described above.

Processor 510, memory 520, transmitter 530, receiver 540 and/or UI 560 may be interconnected by electrical leads internal to device 500 in a multitude of different ways. For example, each of the aforementioned devices may be separately connected to a master bus internal to device 500, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

ANNEX 1: ProblemDetails extended with further attributes

| Attribute name | Data type | P | Cardinality | Description |
|---|---|---|---|---|
| type | Uri | O | 0 . . . 1 | A URI reference according to IETF RFC 3986 that identifies the problem type. |
| title | string | O | 0 . . . 1 | A short, human-readable summary of the problem type. It should not change from occurrence to occurrence of the problem. |
| status | integer | O | 0 . . . 1 | The HTTP status code for this occurrence of the problem. |
| detail | string | O | 0 . . . 1 | A human-readable explanation specific to this occurrence of the problem. |
| instance | Uri | O | 0 . . . 1 | A URI reference that identifies the specific occurrence of the problem. |
| cause | string | C | 0 . . . 1 | A machine-readable application error cause specific to this occurrence of the problem This IE should be present and provide application- related error information, if available. |
| invalidParams | array(Invalid Para m) | C | 1 . . . N | Description of invalid parameters, for a request rejected due to invalid parameters. |
| supportedFeatures | SupportedFeatur es | C | 0 . . . 1 | Features supported by the NF Service Producer. This IE is present when rejecting a request due to an unsupported query parameter, if at least one feature is defined for the corresponding service in the version of the specification that the NF Service Producer implements (see clause 5.2.9 of 3GPP TS 29.500). When present, this IE indicates the features supported by the NF Service Producer; if the NF Service Producer supports no features, this IE is set to the character "0". |
| targetScp | Uri | O | 0 . . . 1 | ApiRoot of the SCP towards which an HTTP request is redirected (see clause 6.10.x of 3GPP TS 29.500). |
| accessTokenErr (NEW attribute) | accessTokenErr | C | 0 . . . 1 | This IE is present when rejecting a request due to access token request error. When present, it should contain the error returned by the Authorization Server. |
| nrfId (NEW attribute) | string | O | 0 . . . 1 | This IE may be present when rejecting a request due to an access token request error or an NF discovery error. When present, it shall contain the identity of the NRF that rejected the request. |
| target NF instance ID (NEW attribute) | string | O | 0 . . . 1 | This IE represents NF instance ID that was discovered and selected by the SCP and for which an access token was requested. |
| target NF set (NEW attribute) | string | O | 0 . . . 1 | This IE represents NF set that was discovered and selected by the SCP and for which an access token was requested. | accessTokenErr may be defined as follows:
 AccessTokenErr:
  description: Error returned in the access token response message
  type: object
  required:
   error
  properties:
   error:
    type: string
    enum:
     invalid_request
     invalid_client
     invalid_grant unauthorized_client
unsupported_grant_type
invalid_scope
error_description:
  type: string
error_uri:
  type: string

The invention claimed is:

1. An apparatus comprising at least one processing core, at least one memory including computer program code, the at least one memory and the computer program code being configured to, with the at least one processing core, cause the apparatus at least to:
receive, from a network function consumer, a service request for a service by a network function producer,
transmit, in response to an error in obtaining an access token directly from a network repository function on the basis of the service request, a response to the service request to the network function consumer wherein the response comprises an identity of the network repository function that rejected the access token request, and wherein the access token is for authorizing access to a service at the network function producer and the response is indicative of an access token error, and
wherein the apparatus comprises a service communication proxy of a service based architecture system.

2. The apparatus according to claim 1, wherein the at least one memory and the computer program code are configured to, with the at least one processing core, cause the apparatus to:
transmit, to the network repository function, an access token request for the access token which authorizes access to the service produced by the network function producer,
receive, from the network repository function, a response to the access token request, wherein the response is indicative of a rejection of the access token request, and
transmit the response indicative of the access token error to the network function consumer in response to the received response to the access token request.

3. The apparatus according to claim 2, wherein the at least one memory and the computer program code are configured to, with the at least one processing core, cause the apparatus to include, in the response indicative of the access token error, information further specifying the rejection of the access token request in accordance with the received response to the access token request from the network repository function.

4. The apparatus according to claim 2, wherein the at least one memory and the computer program code are configured to, with the at least one processing core, cause the apparatus to detect the access token error and transmit the response indicative of the access token error in response to failing to generate an access token request to the network repository function on the basis of the service request.

5. The apparatus according to claim 2, wherein the at least one memory and the computer program code are configured to, with the at least one processing core, cause the apparatus to include, in the response indicative of the access token error, an access token error attribute indicating details on the access token error on the basis of an access token error attribute from the network repository function.

6. The apparatus according to claim 2, wherein the at least one memory and the computer program code are configured to, with the at least one processing core, cause the apparatus to include, in the response indicative of the access token error, an indication of an access token denied error and/or an indication of a missing access token information element.

7. The apparatus according to claim 2, the at least one memory and the computer program code are configured to, with the at least one processing core, cause the apparatus to specify, in the response indicative of the access token error, the access token error in a problem details object of a hypertext transfer protocol error response message payload.

8. The apparatus according to claim 2, wherein the at least one memory and the computer program code are configured to, with the at least one processing core, cause the apparatus to include, in the response indicative of the access token error, an identifier of a target network function instance or a target network function set that was discovered and selected by the apparatus.

9. The apparatus according to claim 2, wherein the network function producer is a network function service producer and the network function consumer is a network function service consumer.

10. A method, comprising:
receiving, by a service communication proxy from a network function consumer, a service request for a service by a network function producer,
transmitting, by the service communication proxy, in response to an error in obtaining an access token directly from a network repository function on the basis of the service request, a response to the service request to the network function consumer wherein the response comprises an identity of the network repository function that rejected the access token request, and, wherein the access token is for authorizing access to a service at the network function producer and the response is indicative of an access token error.

11. The method of claim 10, comprising:
transmitting, to the network repository function, an access token request for the access token which authorizes access to the service produced by the network function producer, receiving, from the network repository function, a response to the access token request, wherein the response is indicative of a rejection of the access token request, and transmitting the response indicative of the access token error to the network function consumer in response to the received response to the access token request.

* * * * *